United States Patent
Ruckle et al.

(10) Patent No.: US 12,352,332 B2
(45) Date of Patent: Jul. 8, 2025

(54) MOLDED HOUSING FRICTION DEVICE HAVING STABLE TORQUE OVER TEMPERATURE RANGE

(71) Applicant: Reell Precision Manufacturing Corporation, St. Paul, MN (US)

(72) Inventors: Dean Ruckle, Bloomington, MN (US); Tyler Jacobs, St. Paul, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 60 days.

(21) Appl. No.: 18/570,474

(22) PCT Filed: Jun. 14, 2022

(86) PCT No.: PCT/US2022/033496
§ 371 (c)(1),
(2) Date: Dec. 14, 2023

(87) PCT Pub. No.: WO2022/266147
PCT Pub. Date: Dec. 22, 2022

(65) Prior Publication Data
US 2024/0271678 A1 Aug. 15, 2024

Related U.S. Application Data

(60) Provisional application No. 63/210,117, filed on Jun. 14, 2021.

(51) Int. Cl.
*E05D 11/08* (2006.01)
*F16F 7/06* (2006.01)

(52) U.S. Cl.
CPC ..................................... *F16F 7/06* (2013.01)

(58) Field of Classification Search
CPC ................. G06F 1/1681; G06F 1/1616; E05Y 2900/606; E05Y 2201/26; E05Y 16/342;
(Continued)

(56) References Cited

U.S. PATENT DOCUMENTS 556,819 A 3/1896 Hartman
578,801 A 3/1897 Wilmot
(Continued)

FOREIGN PATENT DOCUMENTS

EP 1 389 255 8/2006
JP 2008215564 9/2008
(Continued)

OTHER PUBLICATIONS

International Search Report and Written Opinion in PCT/US2022/033496 dated Sep. 26, 2022.

*Primary Examiner* — Chuck Y Mah
(74) *Attorney, Agent, or Firm* — Dicke, Billig & Czaja, PLLC

(57) ABSTRACT

One aspect is an insert molded friction torque device with a rotatable shaft, a friction element mounted over the rotatable shaft in an interference fit, a rigid enclosure structure at least partially enclosing the friction elements, and a single-piece molded housing enclosing the friction element and at least partially enclosing the rigid enclosure structure such that a first portion of the housing is between the friction elements and the rigid enclosure structure within the rigid enclosure structure and a second portion of the housing is outside the rigid enclosure structure.

15 Claims, 21 Drawing Sheets

(58) Field of Classification Search
CPC .. E05Y 16/337; H04M 1/0216; E05D 11/082; E05D 11/084; E05D 11/085; E05D 3/02; E05D 5/14; E05D 2005/145; F16C 11/04
See application file for complete search history.

(56) References Cited

U.S. PATENT DOCUMENTS

| | | | |
|---|---|---|---|
| 3,546,959 A | 12/1970 | Carlson | |
| 4,473,363 A | 9/1984 | Mccutchan | |
| 5,523,142 A | 6/1996 | Bedoussac | |
| 5,542,505 A * | 8/1996 | Kempf | E05D 11/084 192/223.4 |
| 5,566,048 A * | 10/1996 | Esterberg | G06F 1/1681 16/342 |
| 5,697,125 A * | 12/1997 | Gannon | E05D 11/082 16/342 |
| 6,381,809 B2 | 5/2002 | Uneme | |
| 6,530,123 B1 | 3/2003 | Wahlstedt | |
| 7,699,571 B2 | 4/2010 | Booher et al. | |
| 7,895,748 B2 | 3/2011 | Nomura et al. | |
| 8,720,009 B2 | 5/2014 | Schneider | |
| 8,875,348 B2 | 11/2014 | Kossett | |
| 9,284,981 B2 | 3/2016 | Kia et al. | |
| 9,416,863 B2 | 8/2016 | Schaefer | |
| 10,768,672 B2 | 9/2020 | So et al. | |
| 11,008,789 B2 * | 5/2021 | Hatano | E05D 3/12 |
| 11,686,139 B2 * | 6/2023 | Lin | G03B 5/06 16/221 |
| 12,031,587 B2 * | 7/2024 | Larson | F16D 41/206 |
| 2006/0032022 A1 * | 2/2006 | Minami | G06F 1/1681 16/342 |
| 2007/0234517 A1 | 10/2007 | Larson | |
| 2008/0220921 A1 | 9/2008 | Yanai et al. | |
| 2011/0232032 A1 * | 9/2011 | Chu | G06F 1/1681 16/221 |
| 2014/0059805 A1 * | 3/2014 | Krahn | G06F 1/1681 16/342 |
| 2018/0017149 A1 | 1/2018 | Takeuchi et al. | |
| 2021/0277694 A1 * | 9/2021 | Rivas | E05D 5/127 |

FOREIGN PATENT DOCUMENTS

| | | |
|---|---|---|
| JP | 2010014253 | 1/2010 |
| KR | 100631162 | 10/2006 |

* cited by examiner

MOLDED HOUSING FRICTION DEVICE HAVING STABLE TORQUE OVER TEMPERATURE RANGE

CROSS-REFERENCE TO RELATED APPLICATION

This Utility Patent Application claims priority under 35 U.S.C. § 371 to International Application Serial No. PCT/US2022/3496, filed Jun. 14, 2022, which claims priority to U.S. Application Ser. No. 63/210,117, filed Jun. 14, 2021, both of which are incorporated herein by reference in its entirety.

BACKGROUND

Insert molded friction devices are desirable due to the minimal part count and features that can be included in the mold tooling without adding to the part count. These can include snap fit features, mounting holes, locating features, drive lugs, pulley or gear profiles. When hinges are molded with a housing directly over the friction elements, they work very well and have been very successful. However, as environment temperatures change, the friction device torque fluctuates. The need for friction device performance across a temperature range is common in a variety of applications, for example, in automotive applications. Automotive examples include console hinges, load floor hinges, headrest adjustments and overload protection slip devices for mechanisms. A friction device using an insert molded plastic housing for such applications will be subjected to a wide range of temperature, and accordingly, pressure from the plastic on the friction element will greatly impact the torque of the device. For this reason, it is not possible to use this design in temperature sensitive applications. For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1A:
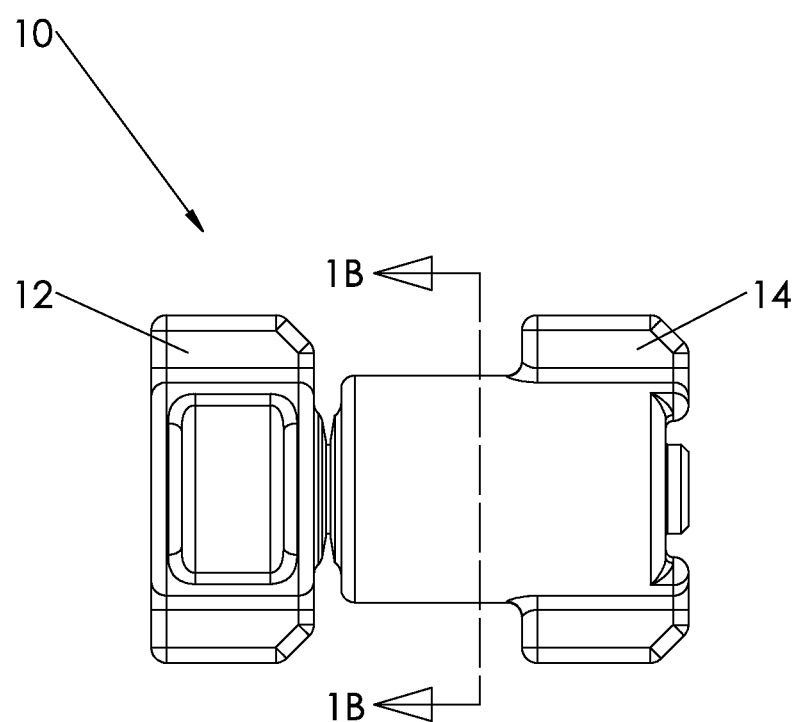
FIGS. 1A-1B illustrate a molded friction device in accordance with the prior art.
Figure 1B:
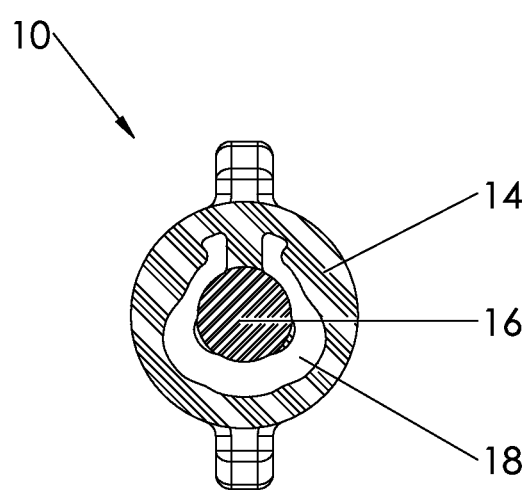

FIGS. 1A and 1B illustrate side and sectional views of a known insert molded friction device 10. In one embodiment, insert molded friction device 10 includes end housing 12 and friction element housing 14, and shaft 16. Shaft 16 is cylindrically shaped and coupled to end housing 12 such that shaft 16 rotates with relative rotation of end housing 12. Shaft 16 is frictionally engaged with friction elements 18.

Frictional element housing 14 is molded over friction elements 18 such that frictional element housing 14 and friction elements 18 are coupled together. When shaft 16 rotates with end housing 12 relative to frictional element housing 14, shaft 16 rotates within friction elements 18 thereby producing torque for friction device 10.

Because frictional element housing 14 is an insert molded plastic, however, it is subject to variation when exposed to temperature changes. As temperatures vary, the molded plastic of housing 14 will expand and contract significantly more than the typical steel shaft 16 and friction elements 18. In some instances, the molded plastic of housing 14 will expand and contract 2-10 times more than the typical steel shaft 16 and friction elements 18. This difference in expansion and contraction varies the pressure from the plastic of the housing 14 on the friction elements 18, and this in turn greatly impacts the overall torque of friction device 10. For this reason, it is not possible to use this design in temperature sensitive applications. For example, when using an insert molded plastic housing for an application at typical automotive temperature ranges, from −30° C. to +80° C., the pressure from the plastic on the friction element will greatly very, thereby greatly impacting and varying the torque, making their use impractical in many automotive applications.

Figure 1C:
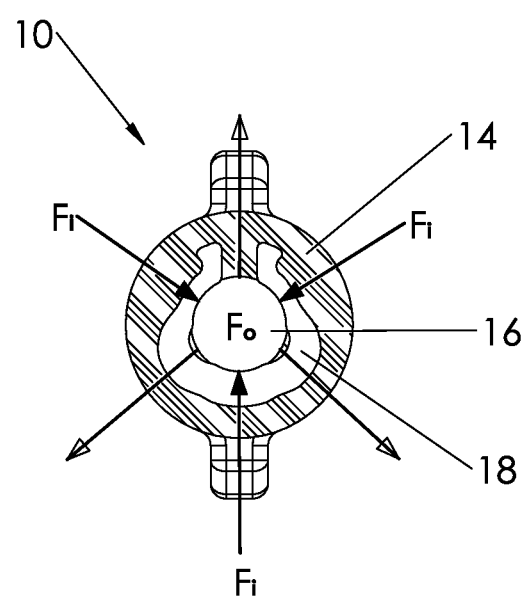
FIG. 1C illustrates a sectional view of molded friction device of FIGS. 1A-1B indicating forces relative to the shaft.
Figure 2:
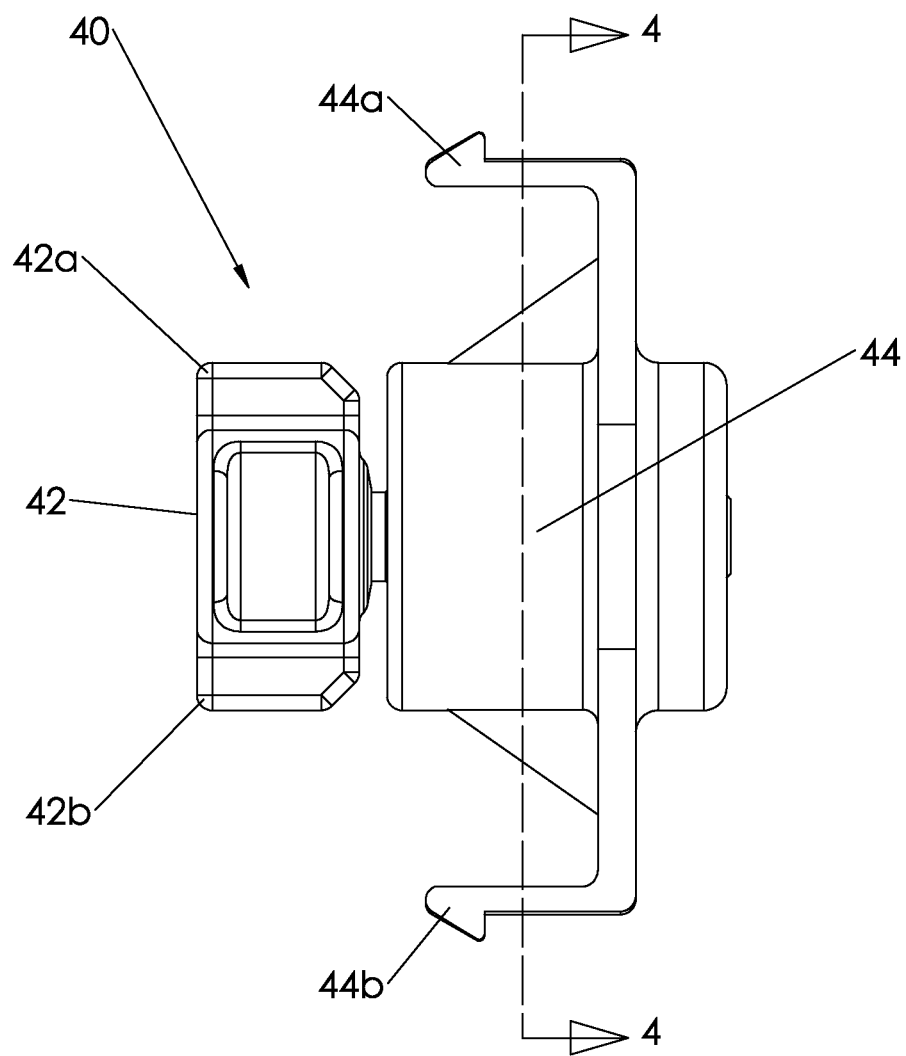
FIG. 2 illustrates a side view of insert molded friction device with a rigid enclosure structure in accordance with one embodiment.
Figure 3:
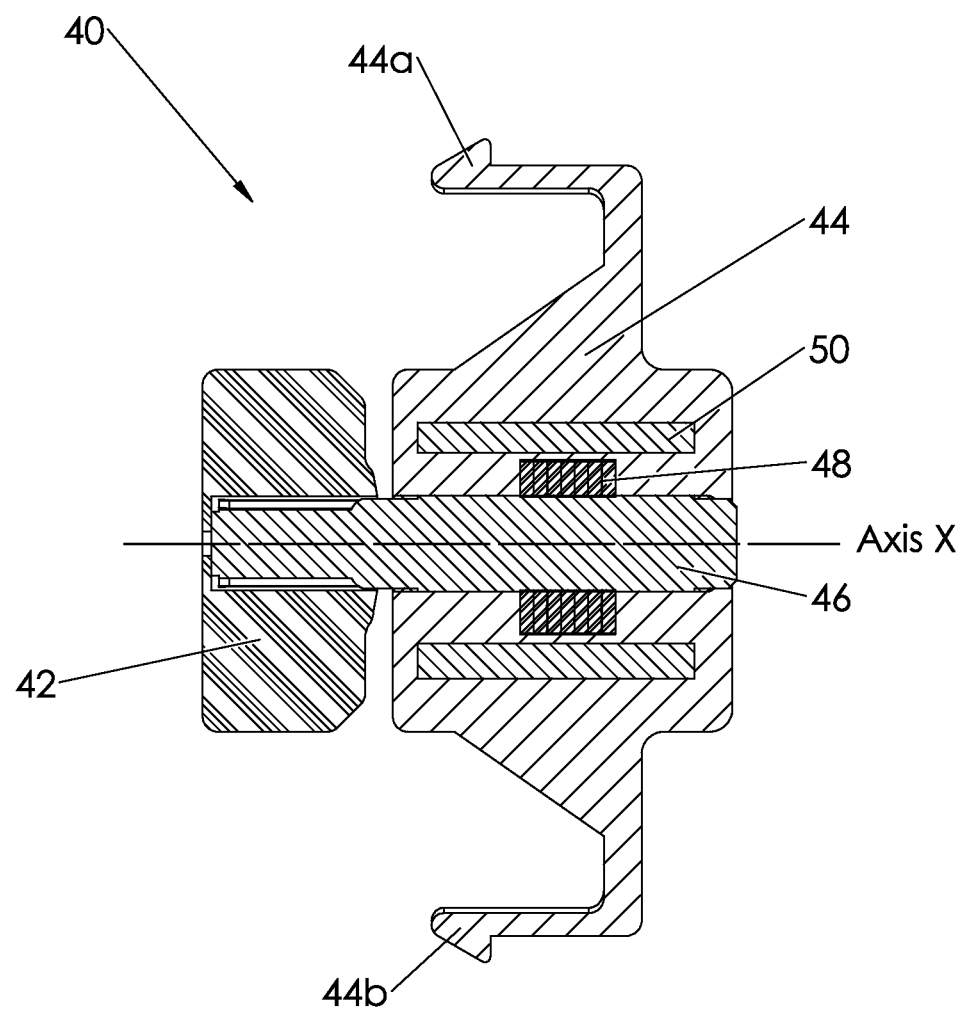
FIGS. 3-4 illustrate sectional views of insert molded friction device with a rigid enclosure structure in accordance with one embodiment.
Figure 4:
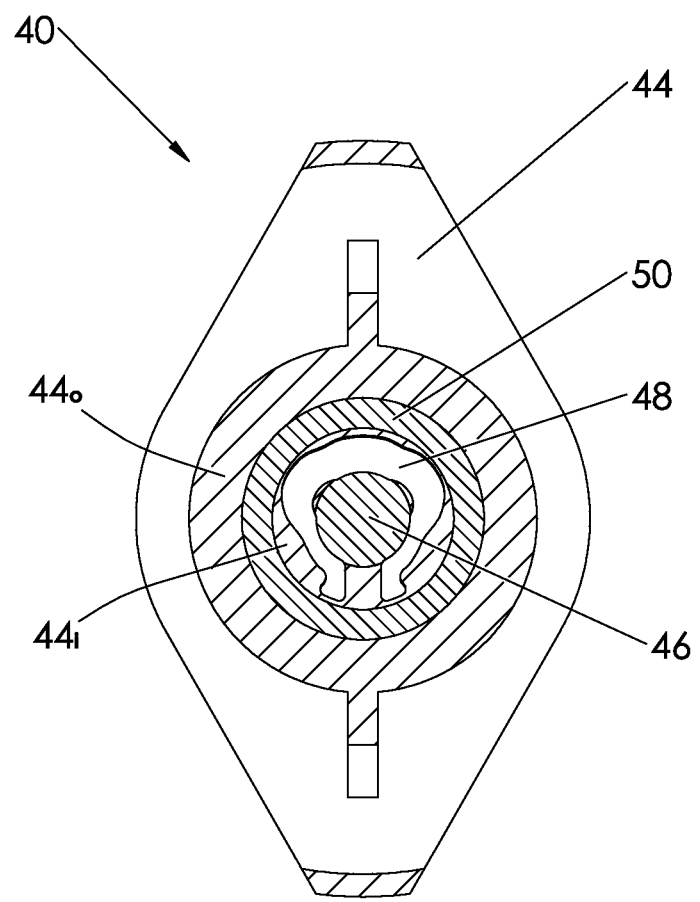
Figure 5:
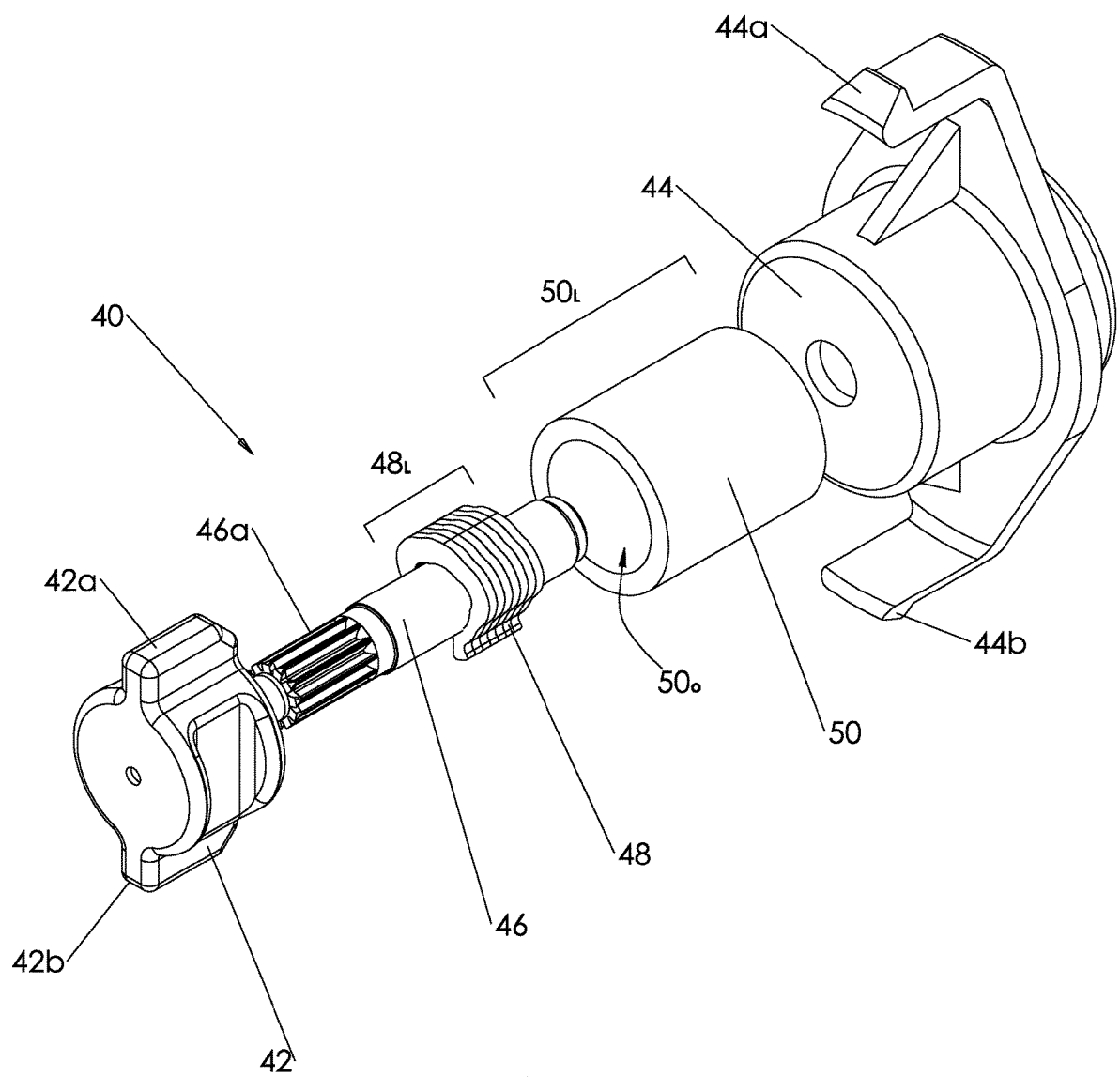
FIG. 5 illustrates an exploded view of insert molded friction device with a rigid enclosure structure in accordance with one embodiment.
Figure 18:
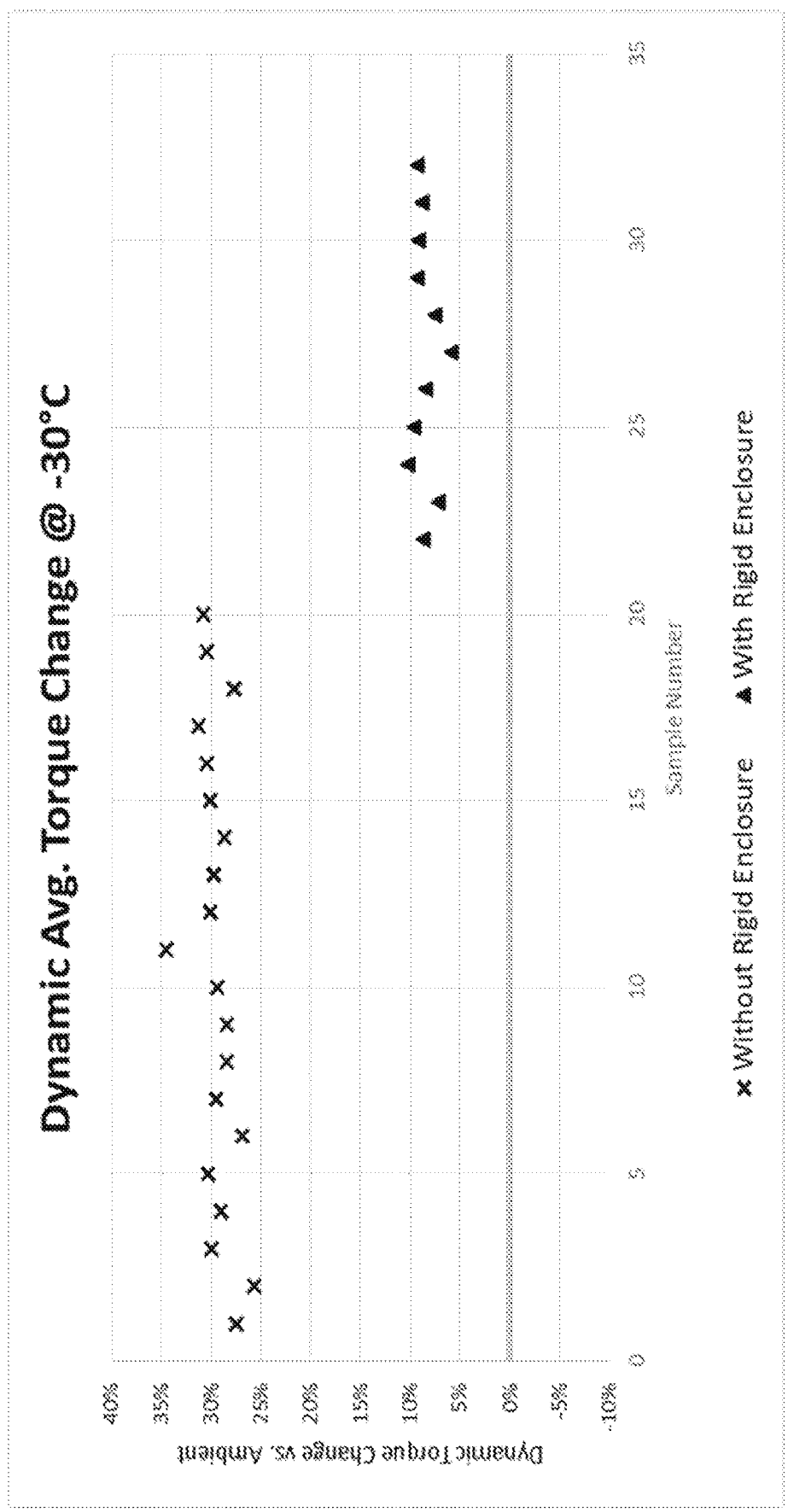
FIG. 18 is a chart illustrating torque variation at very low temperatures for several embodiments of torque devices.
Figure 19:
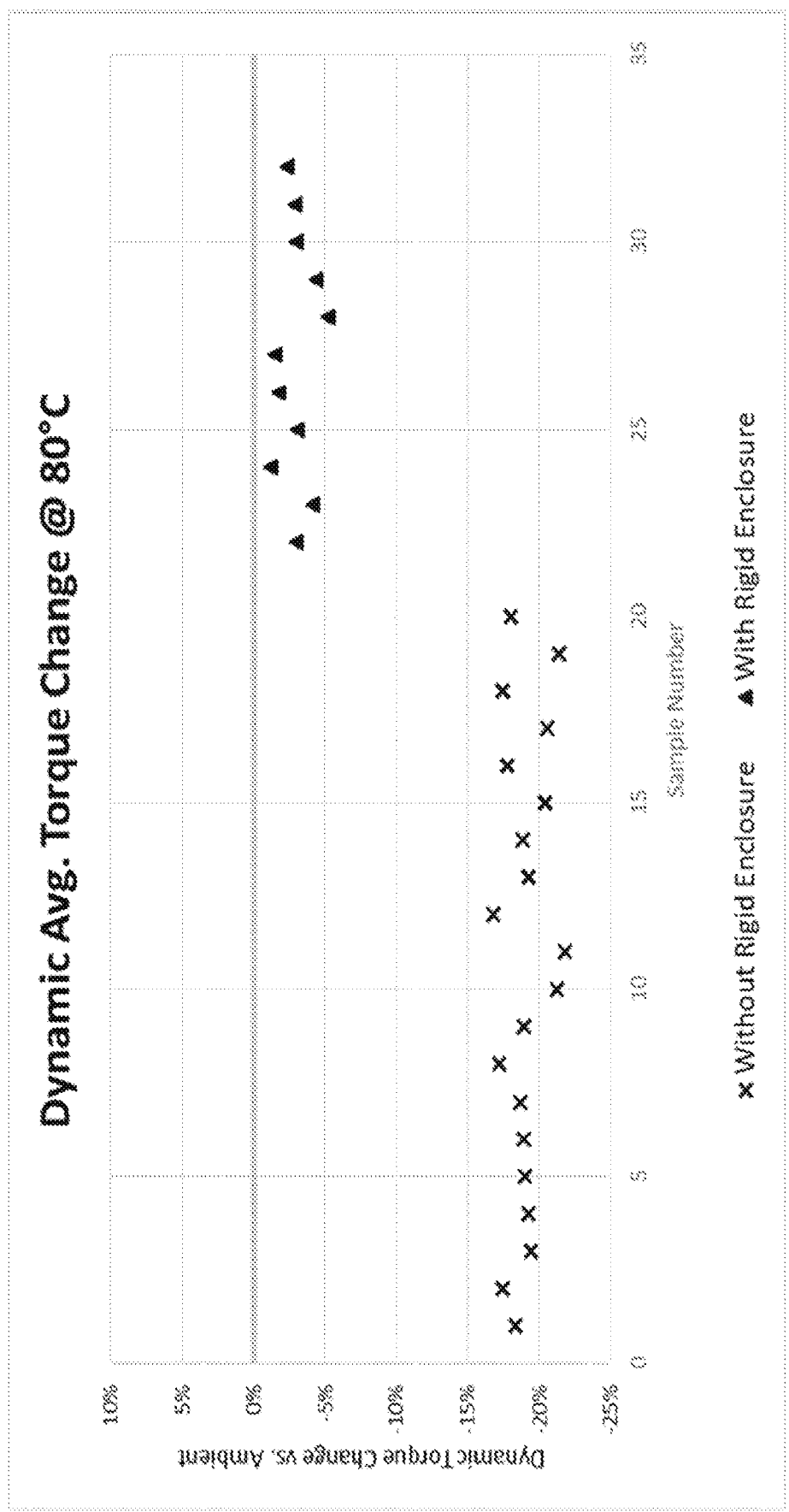
FIG. 19 is a chart illustrating torque variation at very high temperatures for several embodiments of torque devices.

FIG. 1C illustrates the force variations of friction device 10 over a temperature range, which limits the practical usefulness of the device 10. An inward force $F_i$ is illustrated acting on shaft 16 at various locations about its perimeter. As friction device 10 is subjected to low temperatures, for example, −30° C., the plastic in frictional element housing 14 will significantly contract or shrink greatly increasing the inward force $F_i$ acting on shaft 16 and increasing the friction pressure between friction elements 18 and shaft 16. Also, an outward force $F_o$ is illustrated relative to shaft 16 at various locations about its perimeter. As friction device 10 is subjected to high temperatures, for example +80° C., the plastic in frictional element housing 14 will expand significantly away from shaft 16 thereby creating an outward force $F_o$ acting away from shaft 16 and decreasing the friction pressure between friction elements 18 and shaft 16. These increases and decreases in friction pressure between friction elements 18 and shaft 16 greatly impact the friction torque of friction device 10, such that it varies significantly over that temperature range. In fact, testing from one particular sized friction device has shown that torque changes 26-34% at −30° C., and changes 17-22% at 80° C. Testing results for 20 such samples at −30° C. and at 80° C. are illustrated in FIGS. 18 and 19.

FIGS. 2-5 respectively illustrate side, sectional and exploded views of insert molded friction device 40 in accordance with one embodiment. In one embodiment, insert molded friction device 40 includes end housing 42, friction element housing 44, shaft 46, friction elements 48, and rigid enclosure structure 50. In one embodiment, end housing 42 includes first end housing feature 42a and second end housing feature 42b. Friction element housing 44 includes first friction element housing feature 44a and second friction element housing feature 44b.

In one embodiment, end housing 42 is molded over a knurled portion 46a of shaft 46, such that end housing 42 and shaft 46 are fixed together and will rotate together. Other features similar to knurled portion 46a can also be used to fix end housing 42 to shaft 46. First and second end housing features 42a and 42b can be added to end housing 42 such that it can be readily coupled with other components that can rotate end housing 42, or that can be rotated by end housing 42.

In one embodiment, friction elements 48 are mounted over shaft 46 in an interference fit. Accordingly, when shaft 46 is rotated within friction elements 48 friction torque is produced in insert molded friction device 40. The amount of friction torque produced by insert molded friction device 40 is proportional to the number of friction elements 48 that are mounted over shaft 46, the more used, the higher the torque. In some instances, a single friction element 48 is used, in others, many friction elements 48 are used. Accordingly, end housing 42 can be coupled to a first component and friction element housing 44 can be coupled to a second component so the first and second components can rotate with respect to each other with a predictable and consistent friction torque. A lubricant may be applied between the friction element and the rotatable shaft.

In one embodiment, rigid enclosure structure 50 is assembled to surround friction elements 48. In one embodiment, rigid enclosure structure 50 radially surrounds the friction elements 48, such that the friction elements 48 are inside rigid enclosure structure 50. In some embodiments, portions of rigid enclosure structure 50 may contact portions of friction elements 48, while in others there is no contact between them. Rigid enclosure structure 50 can be any of a variety of rigid materials, such as steel or aluminum. In one embodiment, rigid enclosure structure 50 is constructed in a variety of manners; injection molded, powdered metal, machined, formed sheet metal, or stamped. Although rigid enclosure structure 50 radially surrounds the friction elements 48, the sides of rigid enclosure structure 50 include an opening 50o, such that molding material can flow directly over friction elements 48, as is discussed further below. Rigid enclosure structure 50 has a length $50_L$ along the axis X of shaft 46, and the stack of friction elements 48 have a cumulative length $48_L$ along the axis X. In one embodiment, the length $50_L$ of rigid enclosure structure 50 is greater than or equal to the cumulative length $48_L$ of friction elements 48, such that rigid enclosure structure 50 fully encloses the outer perimeter of friction elements 48. This provides excellent blunting of forces from element housing 44 as it is subjected to temperature variation, as is further discussed.

Friction element housing 44 is molded over friction elements 48 and over rigid enclosure structure 50, typically with an injection molding process. Because rigid enclosure structure 50 is open on its axial ends and because there is at least some space or gap between rigid enclosure structure 50 and friction elements 48, a inner portion $44_i$ of friction element housing 44 fills the gap between rigid enclosure structure 50 and friction elements 48 and encloses friction elements 48 such that it forms to the outer profile of friction elements 48. Since the housing 44 is allowed to flow directly over friction elements 48, there is no complex geometry required to secure one to the other. Furthermore, the molding process firmly secures the friction elements 48 and shaft 46 to the friction element housing 44 and thereby completes insert molded friction device 40. Due to the interaction of the plastic and torque element, the insert molded hinges of this type produce high-quality symmetric torque. Friction elements 48 and friction element housing 44 are fixed together and will rotate together.

An outer portion $44_o$ of friction element housing 44 also forms over rigid enclosure structure 50 and can be formed into a variety of advantageous shapes. These can include snap fit features, mounting holes, locating features, drive lugs, pulley or gear profiles. For example, element housing 44 includes first and second molded snaps 44a and 44b, which readily snap fit into other components, such as for an automotive center console application. Because friction element housing 44, with inner and outer portions $44_i$, $44_o$, is a one-piece molded component, it can be easily formed to have a variety of external features, such as the illustrated molded snaps or leaf hinges and similar designs, while also forming around rigid enclosure structure 50 and friction elements 48.

Compared to friction device 10 without any rigid enclosure structure 50, testing has shown that insert molded friction device 40 including rigid enclosure structure 50 provides improved torque performance over a significant temperature range. Embedding rigid enclosure structure 50 within friction element housing 44 prevents a significant amount of the contractive and expansive forces of friction element housing 44, due to temperature changes, from acting directly on friction elements 48 and shaft 46. In this way, the overall torque profile of insert molded friction device 40 is much more stable, even when subjected to a wide range of temperatures.

Figure 6:
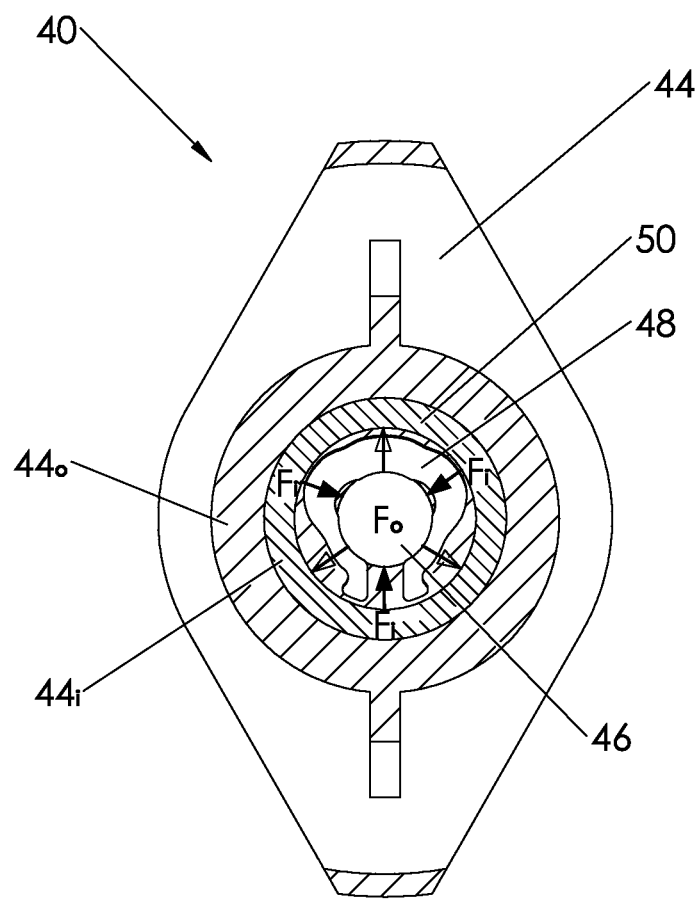
FIG. 6 illustrates a sectional view of insert molded friction device with a rigid enclosure structure indicating forces relative to the shaft in accordance with one embodiment.

FIG. 6 illustrates how the forces within insert molded friction device 40 are blunted by rigid enclosure structure 50, compared to those illustrated in FIG. 1C. FIG. 6 illustrates the very slight force variations of rigid enclosure structure 50 over a temperature range. A small inward force $F_i$ is illustrated acting on shaft 46 at various locations about its perimeter. As insert molded friction device 40 is subjected to low temperatures, for example, −30° C., the plastic in frictional element housing 44 will significantly contract or shrink. Because rigid enclosure structure 50 substantially surrounds friction elements 48 and shaft 46, however, most of the inward force $F_i$ from the contraction are blunted by rigid enclosure structure 50. Accordingly, only a small inward force $F_i$ acts on shaft 46 such that there is not a significant change to the friction pressure between friction elements 48 and shaft 46. Also, as insert molded friction device 40 is subjected to high temperatures, for example +80° C., the plastic in frictional element housing 44 will expand significantly away from shaft 46 creating an outward force $F_o$. Again, due to blunting by rigid enclosure structure 50, only a small outward force $F_o$ acts relative to shaft 46 such that there is not a significant change to the friction pressure between friction elements 48 and shaft 46. Accordingly, these forces do not vary significantly over that temperature range. In fact, testing from the same particular size friction device used above with respect to FIG. 1A-1C, has shown that torque changes in insert molded friction device 40 only 6-10% at −30° C., and changes only 1-5% at 80° C. Testing results for 11 such samples at −30° C. and at 80° C. are illustrated in FIGS. 18 and 19.

Figure 7:
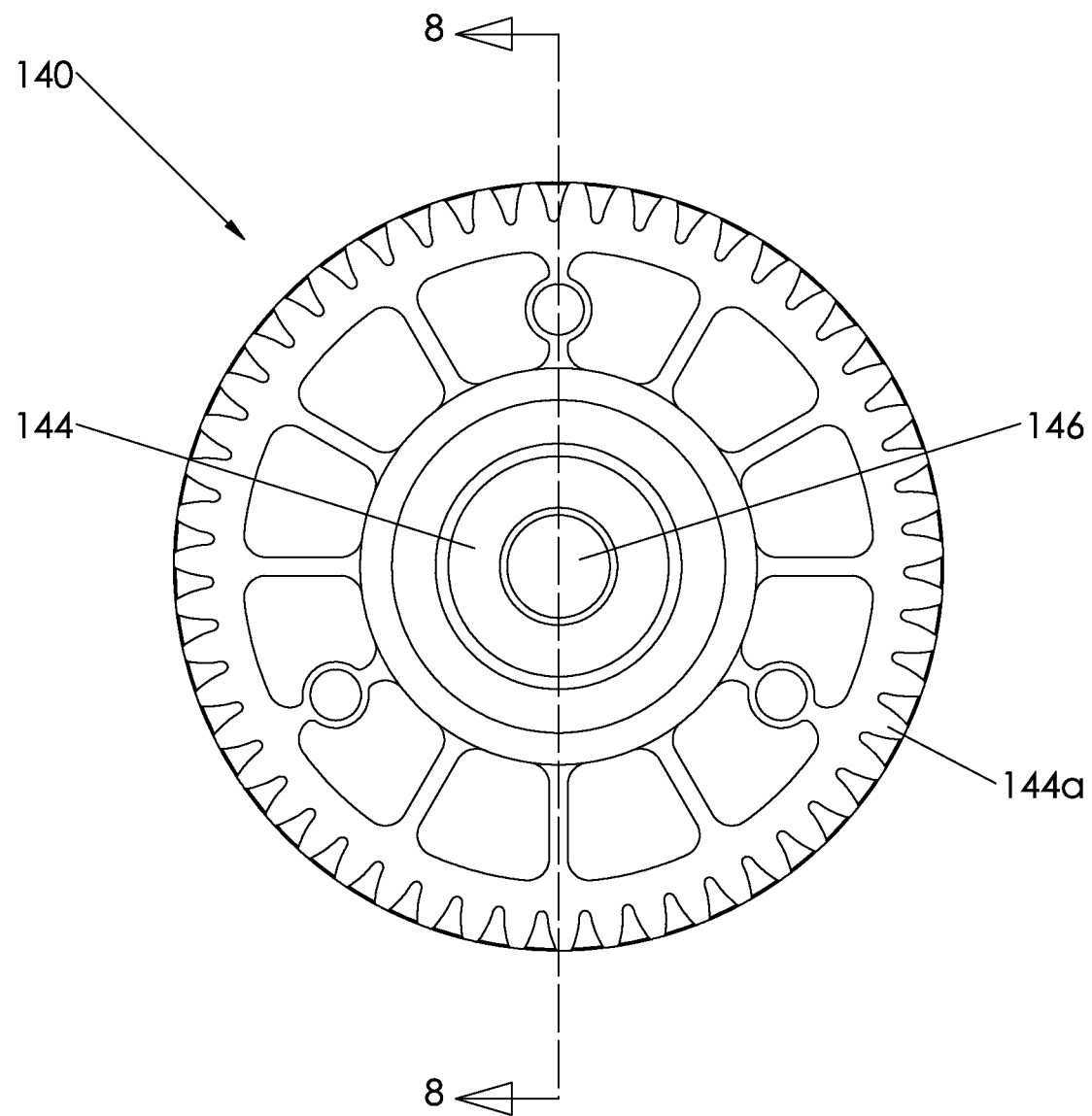
FIG. 7 illustrates a side view of insert molded friction device with a rigid enclosure structure in accordance with one embodiment.
Figure 8:
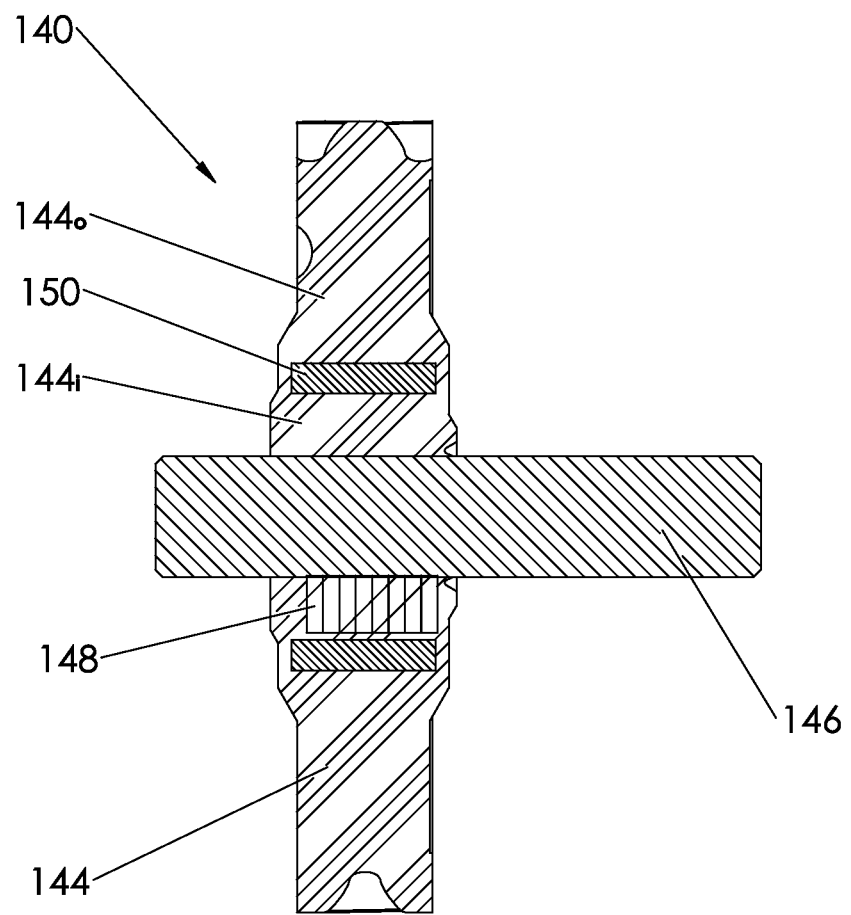
FIG. 8 illustrates a sectional view of insert molded friction device with a rigid enclosure structure in accordance with one embodiment.
Figure 9:
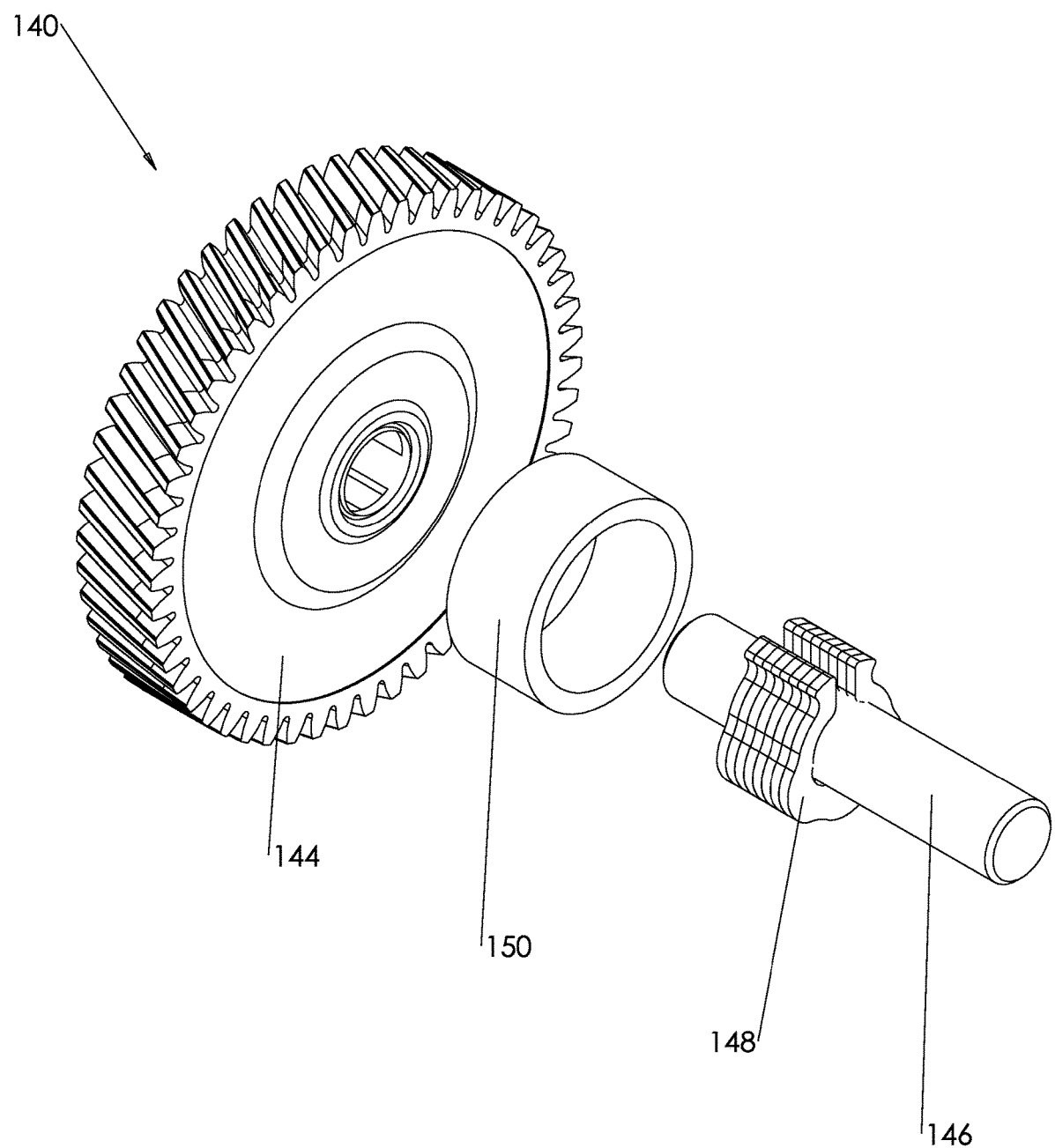
FIG. 9 illustrates an exploded view of insert molded friction device with a rigid enclosure structure in accordance with one embodiment.
Figure 10:
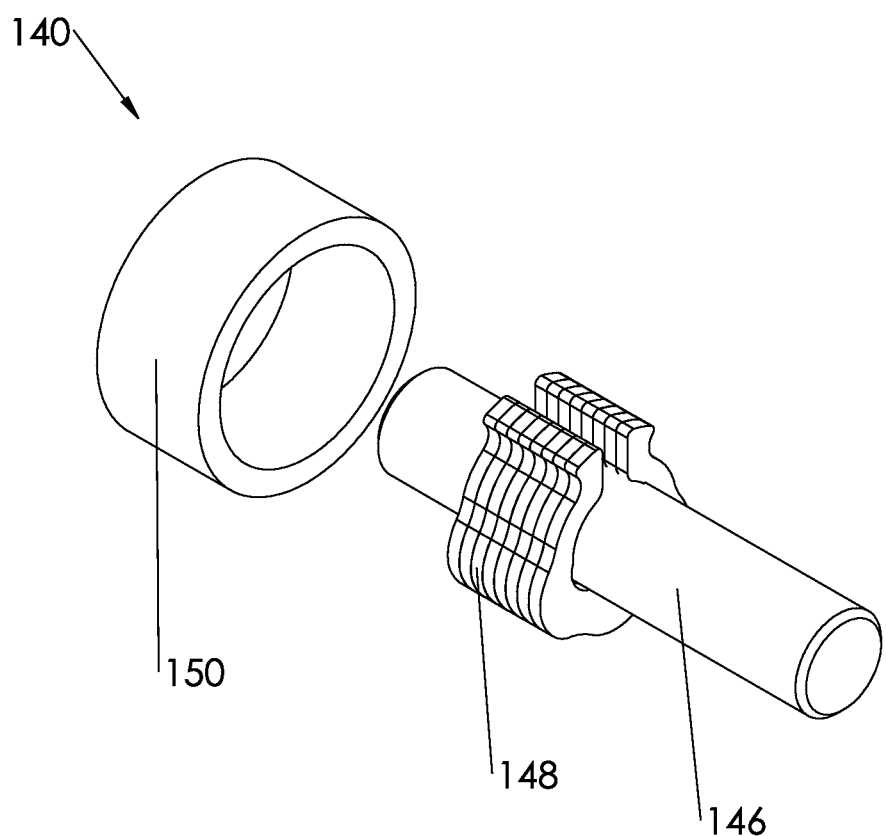
FIG. 10 illustrates a partial exploded view of insert molded friction device with a rigid enclosure structure in accordance with one embodiment.
Figure 11:
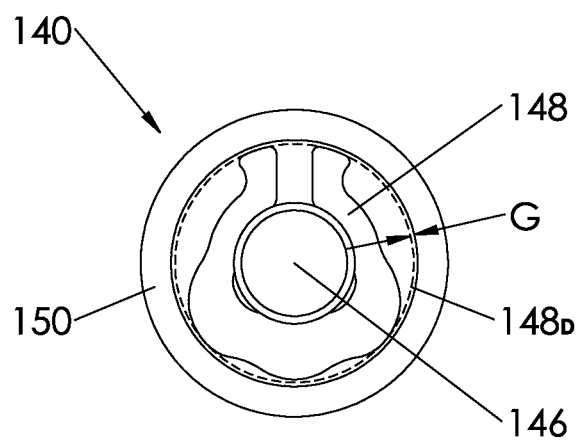
FIG. 11 illustrates an end view of insert molded friction device with a rigid enclosure structure in accordance with one embodiment.

FIGS. 7-9 respectively illustrate side, sectional and exploded views of insert molded friction device 140 in accordance with one embodiment. In one embodiment, insert molded friction device 140 includes friction element housing 144, shaft 146, friction elements 148, and rigid enclosure structure 150. In one embodiment, friction element housing 144 includes housing feature 144a, which in one example is gear teeth. FIGS. 10 and 11 have friction element housing 144 removed to more fully illustrate shaft 146, friction elements 148, and rigid enclosure structure 150 in respective exploded and section views.

Insert molded friction device 140 is similar to insert molded friction device 40 described above. In one embodiment, a housing (similar to end housing 42 in FIG. 2) can be added to shaft 146, such that it can be readily coupled with other components that can rotate shaft 146.

In one embodiment, friction elements 148 are mounted over shaft 146 in an interference fit. Accordingly, when shaft 146 is rotated within friction elements 148 friction torque is produced in insert molded friction device 140. The amount of friction torque produced by insert molded friction device 140 is proportional to the number of friction elements 148 are mounted over shaft 146, the more used, the higher the torque. In some instances, a single friction element 148 is used, in others, many friction elements 148 are used.

In one embodiment, rigid enclosure structure 150 is assembled to surround friction elements 148. In some embodiments, portions of rigid enclosure structure 150 may contact portions of friction elements 148, while in others there is no contact between them. Rigid enclosure structure 150 can be any of a variety of rigid materials, such as steel or aluminum. In one embodiment, rigid enclosure structure 150 is constructed in a variety of manners; injection molded, powdered metal, machined, formed sheet metal, or stamped.

Friction element housing 144 is molded over friction elements 148 and over rigid enclosure structure 150, typically with an injection molding process. Because there is at least some space or gap between rigid enclosure structure 150 and friction elements 148, an inner portion $144_i$ of friction element housing 144 fills the gap between rigid enclosure structure 150 and encloses friction elements 148 such that it forms to the outer profile of friction elements 148. Since the housing 144 is allowed to flow directly over friction elements 48, there is no complex geometry required secure one to the other. Furthermore, the molding process firmly secures the friction elements 148 and shaft 146 to the friction element housing 144 and thereby completes insert molded friction device 140. Due to the interaction of the plastic and torque element, the insert molded hinges of this type produce high-quality symmetric torque. Friction elements 148 and friction element housing 144 are fixed together and will rotate together.

As with prior embodiments, an outer portion $144_o$ of friction element housing 144 also forms over rigid enclosure structure 150 and can be formed into a variety of advantageous shapes. In one embodiment, friction element housing 144 is formed with gear teeth 144a on its outer perimeter, which can be used in a variety of applications to rotate with or relative to shaft 146. Because friction element housing 144, with inner and outer portions $144_i$, $144_o$, is a one-piece molded component, it can be easily formed to have a variety of external features.

Molding gear teeth 144a as part of friction element housing 144 has further advantages as well. For gears that need overload slip protection, overmolding the gear provides the best gear accuracy by eliminating tolerance stack up from press fit assemblies. It also provides good support of gear radial and thrust loads without any free play or wobble.

Compared to friction device 10 without any rigid enclosure structure 150, testing has shown that insert molded friction device 140 including rigid enclosure structure 150 provides improved torque performance over a significant temperature range. Embedding rigid enclosure structure 150 within friction element housing 144 prevents a significant amount of the contractive and expansive forces of friction element housing 144, due to temperature changes, from acting directly on friction elements 148 and shaft 146. In this way, the overall torque profile of insert molded friction device 140 is much more stable, even when subjected to a wide range of temperatures.

Figure 12:
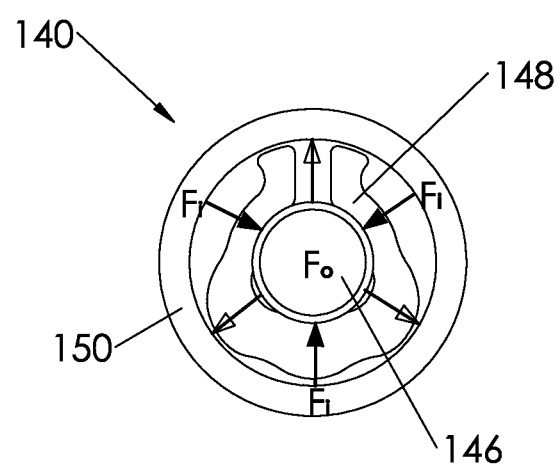
FIG. 12 illustrates a sectional view of insert molded friction device with a rigid enclosure structure indicating forces relative to the shaft in accordance with one embodiment.

FIG. 12 illustrates how the forces within insert molded friction device 140 are blunted by rigid enclosure structure 150, compared to those illustrated in FIG. 1C. FIG. 12 illustrates the very slight force variations of rigid enclosure structure 150 over a temperature range. A small inward force $F_i$ is illustrated acting on shaft 146 at various locations about its perimeter. As insert molded friction device 140 is subjected to low temperatures, for example, −30° C., the plastic in frictional element housing 144 will significantly contract or shrink. Because rigid enclosure structure 150 substantially surrounds friction elements 148 and shaft 146, however, most of the inward force $F_i$ from the contraction are blunted by rigid enclosure structure 150. Accordingly, only a small inward force $F_i$ acts on shaft 146 such that there is not a significant change to the friction pressure between friction elements 148 and shaft 146. Also, as insert molded friction device 140 is subjected to high temperatures, for example +80° C., the plastic in frictional element housing 144 will expand significantly away from shaft 146 creating an outward force $F_o$. Again, due to rigid enclosure structure 150, only a small outward force $F_o$ acts relative to shaft 146 such that there is not a significant change to the friction pressure between friction elements 148 and shaft 146. Accordingly, these forces do not vary significantly over that temperature range. In fact, testing from the same particular size friction device used above with respect to FIGS. 1A-1C and FIG. 6, has shown that torque changes 5-10% at −30° C., and changes 1-6% at 80° C.

In one embodiment, with reference to FIG. 11, the gap G between the inner surface of rigid enclosure structure 150 and a diameter $148_D$ defined by the outermost surface of friction elements 148 is minimized thereby further improving the torque performance over large ranges of temperature. The diameter $148_D$ defined by the outermost surface of friction elements 148 relative to the gap G is also a factor in torque performance. In one embodiment, the gap G between the inner surface of rigid enclosure structure 150 and the diameter $148_D$ defined by the outermost surface of friction elements 148 is less than 50% of the diameter $148_D$ defined by the outermost surface of friction elements 148 in order to ensure an improving the torque performance. In another embodiment, the gap G between the inner surface of rigid enclosure structure 150 and the diameter $148_D$ defined by the outermost surface of friction elements 148 is less than 25% of the diameter $148_D$ defined by the outermost surface of friction elements 148 in order to further ensure an improving the torque performance.

Figure 13:
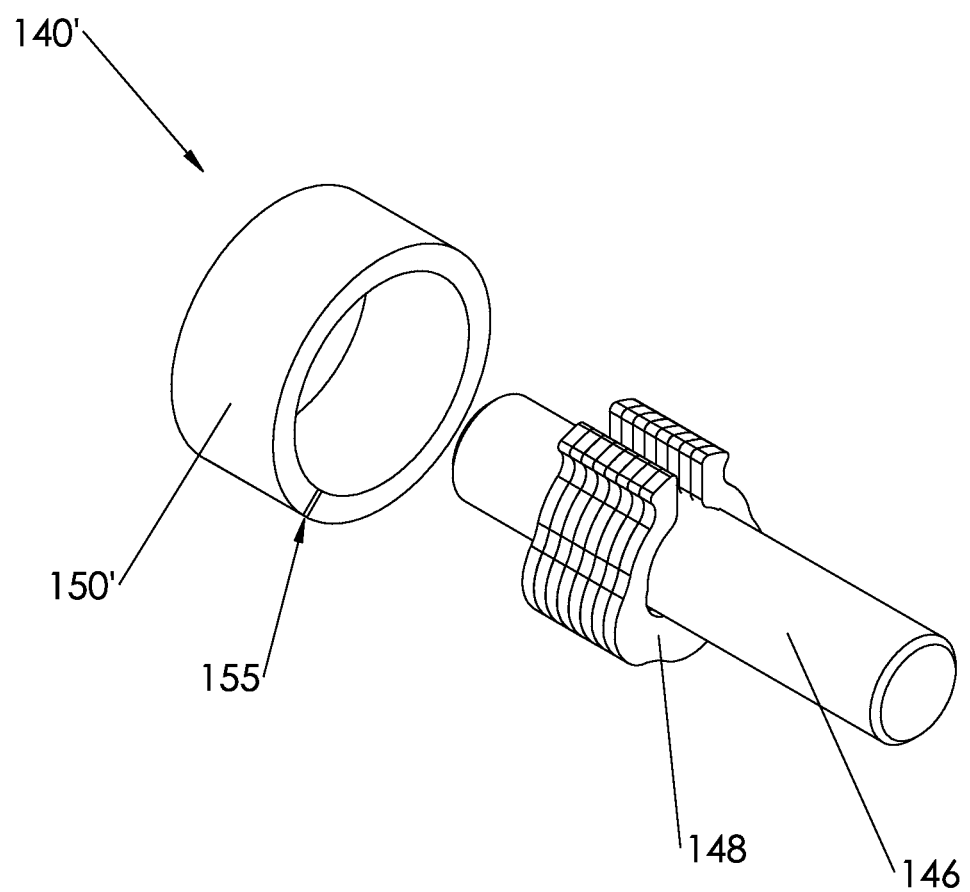
FIG. 13 illustrates a partial exploded view of insert molded friction device with a rigid enclosure structure in accordance with one embodiment.
Figure 14:
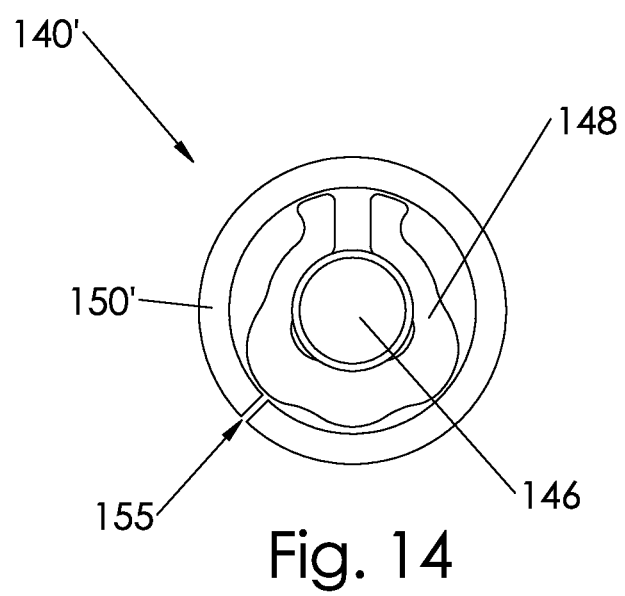
FIG. 14 illustrates an end view of insert molded friction device with a rigid enclosure structure in accordance with one embodiment.

FIGS. 13-14 respectively illustrate exploded and sectional views of a portion of insert molded friction device 140' in accordance with one embodiment. Insert molded friction devices 140 and 140' are essentially the same, except that a split rigid enclosure structure 150' (see FIG. 13) is used instead rigid enclosure structure 150 (see FIG. 10). In one embodiment, a slot 155 or opening is provided through split rigid enclosure structure 150', such that friction element housing 144 flows through slot 155.

As with the prior embodiment of FIGS. 7-12, friction element housing 144 is molded over friction elements 148 and over split rigid enclosure structure 150' of FIGS. 13-14, typically with an injection molding process. An inner portion $144_i$ of friction element housing 144 fills the gap between split rigid enclosure structure 150' and encloses friction elements 148, and flows through slot 155, such that it forms to the outer profile of friction elements 148. As with prior embodiments, an outer portion $144_o$ of friction element housing 144 also forms over split rigid enclosure structure 150' and can be formed into a variety of advantageous shapes.

As with prior embodiments, the forces within insert molded friction device 140' are blunted by split rigid enclosure structure 150', compared to those illustrated in FIG. 1C. In fact, even where there is a slot 155 or other gap in split rigid enclosure structure 150', the forces within insert molded friction device 140' are blunted by split rigid enclosure structure 150' very similarly to how forces within insert molded friction device 140 are blunted by rigid enclosure structure 150, which does not have a split. In this way, the overall torque profile of insert molded friction device 140' is much more stable, even when subjected to a wide range of temperatures.

Figure 15:
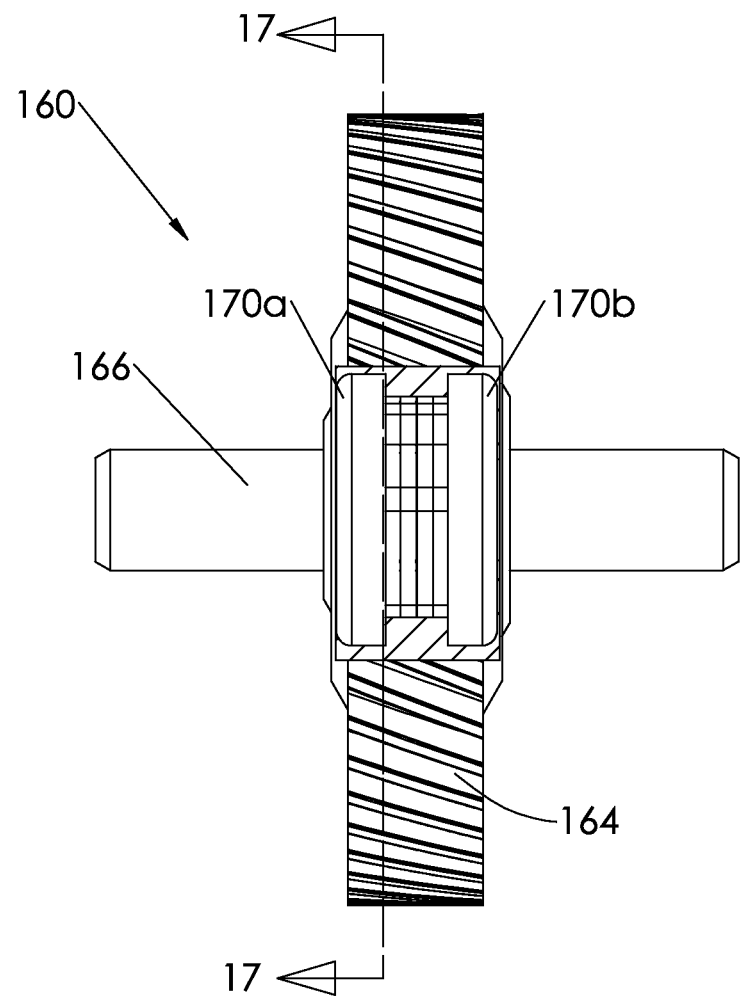
FIG. 15 illustrates a side view of insert molded friction device with a rigid enclosure structure in accordance with one embodiment.
Figure 16:
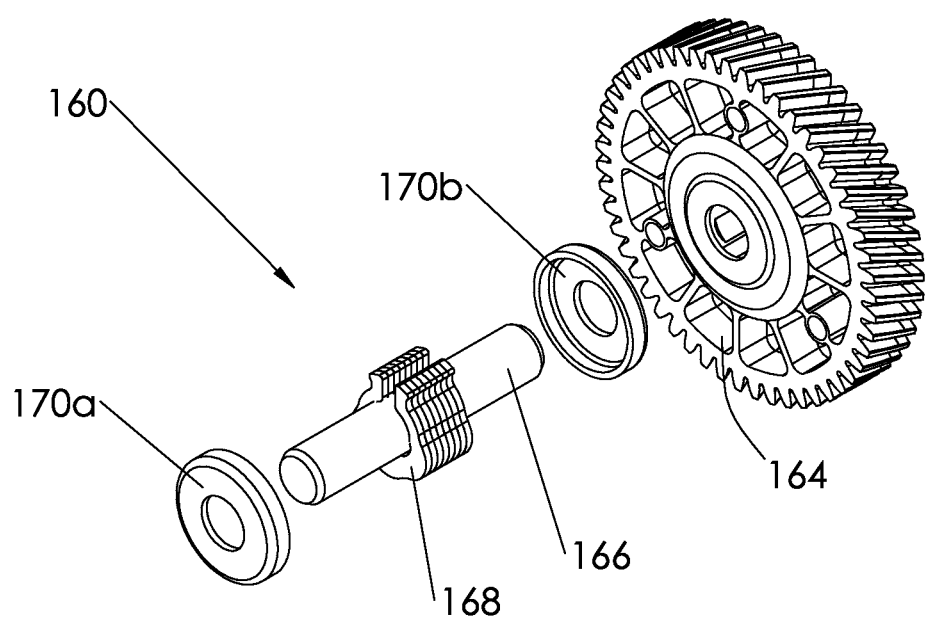
FIG. 16 illustrates an exploded view of insert molded friction device with a rigid enclosure structure in accordance with one embodiment.
Figure 17:
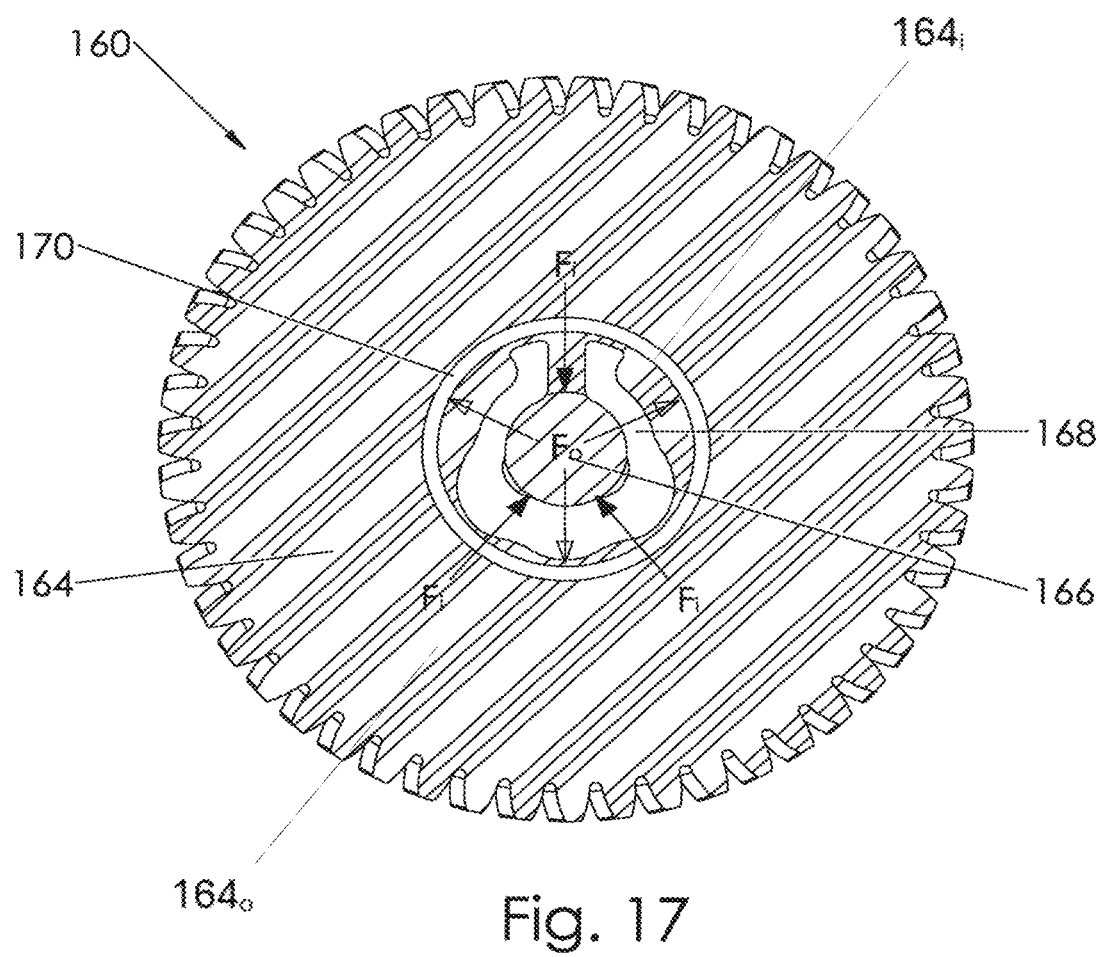
FIG. 17 illustrates a sectional view of insert molded friction device with a rigid enclosure structure in accordance with one embodiment.

FIGS. 15-17 respectively illustrate side, exploded and sectional views of insert molded friction device 160 in accordance with one embodiment. In one embodiment, insert molded friction device 160 includes friction element housing 164, shaft 166, friction elements 168, and rigid enclosure structure 170. Insert molded friction device 160 is similar to insert molded friction devices 40 and 140 described above. In one embodiment, a housing (similar to end housing 42 in FIG. 2) can be added to shaft 166, such that it can be readily coupled with other components that can rotate shaft 166. In FIG. 15, friction housing 164 is partially ghosted so that rigid enclosure structure 170 and friction elements 168 are visible.

In one embodiment, friction elements 168 are mounted over shaft 166 in an interference fit. Accordingly, when shaft 166 is rotated within friction elements 168 friction torque is produced in insert molded friction device 160. The amount of friction torque produced by insert molded friction device 160 is proportional to the number of friction elements 168 are mounted over shaft 166, the more used, the higher the torque. In some instances, a single friction element 168 is used, in others, many friction elements 168 are used.

Rigid enclosure structure 170 is assembled at least partially around friction elements 168. Unlike previous embodiments that radially surrounded friction elements, in one embodiment, rigid enclosure structure has a first cup portion 170a and a second cup portion 170b, which partially surround friction elements 168 along the axis of shaft 166. In one embodiment, first and second cup portions 170a and 170b are spaced apart along the axis of shaft 168, leaving an opening between them (best seen in FIG. 15 between the ghosted portions of housing 164). Accordingly, molded material can be flowed directly over friction elements 168. In other embodiments, first and second cup portions 170a and 170b are not spaced apart along the axis of shaft 168 and are closed together, but are also provided with holes, castellations, slots and other such openings can be alternatively used to allow the housing 164 to flow within first and second cup portions 170a and 170b to create the interface geometry and secure the friction elements 168.

Friction element housing 164 is molded over friction elements 168 and over rigid enclosure structure 170, typically with an injection molding process. Because there is at least some space or gap between first and second cup portions 170a and 170b of rigid enclosure structure 170, an inner portion $164_i$ of friction element housing 164 fills the gap between rigid enclosure structure 170 and encloses friction elements 168 such that it forms to the outer profile of friction elements 168. Since the housing 164 is allowed to flow directly over friction elements 168, there is no complex geometry required secure one to the other. Furthermore, the molding process firmly secures the friction elements 168 and shaft 166 to the friction element housing 164 and thereby completes insert molded friction device 160. Due to the interaction of the plastic and torque element, the insert molded hinges of this type produce high-quality symmetric torque. Friction elements 168 and friction element housing 164 are fixed together and will rotate together.

As with prior embodiments, an outer portion $164_o$ of friction element housing 164 also forms over rigid enclosure structure 170 and can be formed into a variety of advantageous shapes.

As with prior embodiments, the forces within insert molded friction device 160 are blunted by split rigid enclosure structure 170, compared to those illustrated in FIG. 1C. In fact, even where there is a gap between first and second cup portions 170a and 170b enclosure structure 170, the forces within insert molded friction device 160 are blunted by rigid enclosure structure 170 very similarly to prior embodiments that include a rigid enclosure structure. In this way, the overall torque profile of insert molded friction device 160 is much more stable, even when subjected to a wide range of temperatures.

In one embodiment, each of first and second cup portions 170a and 170b have an outer diameter that is larger than the largest diameter of friction elements 168. In this way, friction elements 168 are protected by first and second cup portions 170a and 170b, at least in the radial direction. While each of first and second cup portions 170a and 170b may have slots or perforations, their larger diameters will provide good protection to friction elements 168 from pressures from housing 164 in the radial direction.

With the various embodiments illustrated, friction elements (for example, 48, 148, 168) have been clips mounted over a shaft. In alternative embodiments, other types of friction devices can be used within the rigid enclosure structure, such as question mark bands, drag springs, friction discs, and others.

Furthermore, with the various embodiments illustrated, rigid enclosure structures (for example, 50, 150, 150', 170), the exact shape of the rigid enclosure structure is not intended to be limited to what is shown. Mostly circular elements are shown and are most likely lower cost to create, however, other shapes can also be used and should be considered included within the scope of the embodiments. For example, rings could have perforations or slots to allow plastic connection and flow through the structure. Rigid enclosure structures could have castellations, points or slots on the ends faces. Rigid enclosure structures could have knurls, grooves or radial protrusions on the inner or outer diameter. Square tubing or other profiles are also possible. Washers could be non-circular shaped or have holes or slots and still provide the structure to gain the temperature performance described.

FIG. 18 is a chart illustrating torque variation at very low temperatures for several embodiments of torque devices. Several torque devices, such as those described in FIGS. 1A-1C, were constructed without a rigid enclosure structure and tested at temperatures of −30° C. The various samples tested are illustrated and show that torque changes from 26-34% at this low temperature. Similarly, several torque devices, such as those described in FIGS. 2-5, were constructed including a rigid enclosure structure and tested at temperatures of −30° C. The various samples tested are illustrated and show that torque changes from 6-10% at this low temperature. Accordingly, the rigid enclosure structure was found to greatly stabilize torque performance over temperature variation.

FIG. 19 is a chart illustrating torque variation at very high temperatures for several embodiments of torque devices. Several torque devices, such as those described in FIGS. 1A-1C, were constructed without a rigid enclosure structure and tested at temperatures of 80° C. The various samples tested are illustrated and show that torque changes from 17-22% at this high temperature. Similarly, several torque devices, such as those described in FIGS. 2-5, were constructed including a rigid enclosure structure and tested at temperatures of 80° C. The various samples tested are illustrated and show that torque changes from 1-5% at this high temperature. Accordingly, the rigid enclosure structure was found to greatly stabilize torque performance over temperature variation.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An insert molded friction torque device comprising:
   a rotatable shaft;
   a friction element mounted over the rotatable shaft in an interference fit;
   a rigid enclosure structure at least partially enclosing the friction elements; and
   a single-piece molded housing enclosing the friction element and at least partially enclosing the rigid enclosure structure such that a first portion of the housing is between the friction element and the rigid enclosure structure within the rigid enclosure structure and a second portion of the housing is outside the rigid enclosure structure.

2. The insert molded friction torque device of claim 1, wherein the rigid enclosure structure is a solid ring that radially surrounds the friction element.

3. The insert molded friction torque device of claim 1, wherein the rigid enclosure structure is a pair of cup portions that axially enclose the friction element on either side of the friction element.

4. The insert molded friction torque device of claim 1, wherein the rigid enclosure structure is a slotted ring that radially surrounds the friction element.

5. The insert molded friction torque device of claim 1, wherein the rigid enclosure structure has an axial length along an axis of the shaft the friction element includes a plurality of clips stacked along the shaft, the plurality of clips have a length along the shaft and wherein the length of the rigid enclosure structure is greater than or equal to the length of the plurality of clips.

6. The insert molded friction torque device of claim 1, wherein a gap between an inner surface of the rigid enclosure structure and a diameter defined by the outermost surface of friction elements is less than 50% of the diameter defined by the outermost surface of the friction elements.

7. The insert molded friction torque device of claim 1, wherein a gap between an inner surface of the rigid enclosure structure and a diameter defined by the outermost surface of friction elements is less than 25% of the diameter defined by the outermost surface of the friction elements.

8. An insert molded friction torque device comprising:
   a rotatable shaft;
   a friction element mounted over the rotatable shaft in an interference fit;

a rigid ring enclosure radially enclosing the friction elements and having at least one side opening to an inside of the ring enclosure; and a single-piece molded housing enclosing the friction element and at least partially enclosing the rigid ring enclosure such that a first portion of the molded housing is inside the rigid ring enclosure and between the friction element and the rigid ring enclosure structure and a second portion of the molded housing is outside the rigid ring enclosure.

9. An insert molded friction torque device comprising:

a rotatable shaft;

a friction element mounted over the rotatable shaft in an interference fit;

a first rigid enclosure element mounted over the shaft on a first side of the friction element and a second rigid enclosure element mounted over the shaft on a second side of the friction element opposite the first, where the first and second rigid enclosure elements each have an outer diameter that is larger than a largest outer diameter of the friction element, thereby axially enclosing the friction element in between the first and second rigid enclosure elements; and a single-piece molded housing enclosing the friction element and at least partially enclosing the first and second rigid enclosure elements such that a first portion of the housing is between the friction element and first and second rigid enclosure elements within the first and second rigid enclosure elements and a second portion of the housing is outside the first and second rigid enclosure elements.

10. The insert molded friction torque device of claim 1, further comprising a lubricant between the friction element and the rotatable shaft.

11. The insert molded friction torque device of claim 1, wherein the friction element comprises one of a plurality of clips stacked along the shaft, a question mark band wrapped around the shaft, drag springs wrapped around the shaft, and friction discs mounted on the shaft.

12. The insert molded friction torque device of claim 1, wherein the rigid enclosure structure at least partially encloses the friction elements and also includes an opening such that the molded housing extends within the rigid enclosure structure through the opening.

13. The insert molded friction torque device of claim 1, wherein the molded housing is cylindrical body with torque transmission features.

14. The insert molded friction torque device of claim 1, wherein the molded housing is a gear.

15. The insert molded friction torque device of claim 1, wherein the molded housing is a plastic material having a coefficient of thermal expansion that is at least 2 times that of the friction element and the shaft.

* * * * *